United States Patent [19]

Rubens

[11] 4,219,646
[45] Aug. 26, 1980

[54] PROCESS FOR PREPARING CROSS-LINKED STARCHES USING STMP

[75] Inventor: Roger W. Rubens, Somerville, N.J.

[73] Assignee: National Starch and Chemical Corp., Bridgewater, N.J.

[21] Appl. No.: 21,519

[22] Filed: Mar. 19, 1979

Related U.S. Application Data

[62] Division of Ser. No. 888,382, Mar. 20, 1978.

[51] Int. Cl.$^2$ ............................................. C08B 31/02
[52] U.S. Cl. ..................................... 536/109; 426/661
[58] Field of Search .......................................... 536/109

[56] References Cited

U.S. PATENT DOCUMENTS

| | | | |
|---|---|---|---|
| 2,884,412 | 4/1959 | Neukom | 536/109 |
| 2,884,413 | 4/1959 | Kerr et al. | 536/109 |
| 3,553,195 | 1/1971 | Jarowenko | 536/109 |

*Primary Examiner*—Melvyn I. Marquis
*Attorney, Agent, or Firm*—Edwin Szala; Ellen T. Dec

[57] ABSTRACT

The invention discloses a dual derivatizing process for the preparation of cold water swelling starches and foodstuffs thickened therewith. The starch base is first subjected to a primary crosslinking reaction using sodium trimetaphosphate (STMP) according to conventional techniques, then reslurried, treated with additional STMP and drum dried to effect a secondary crosslinking reaction in situ.

7 Claims, 4 Drawing Figures

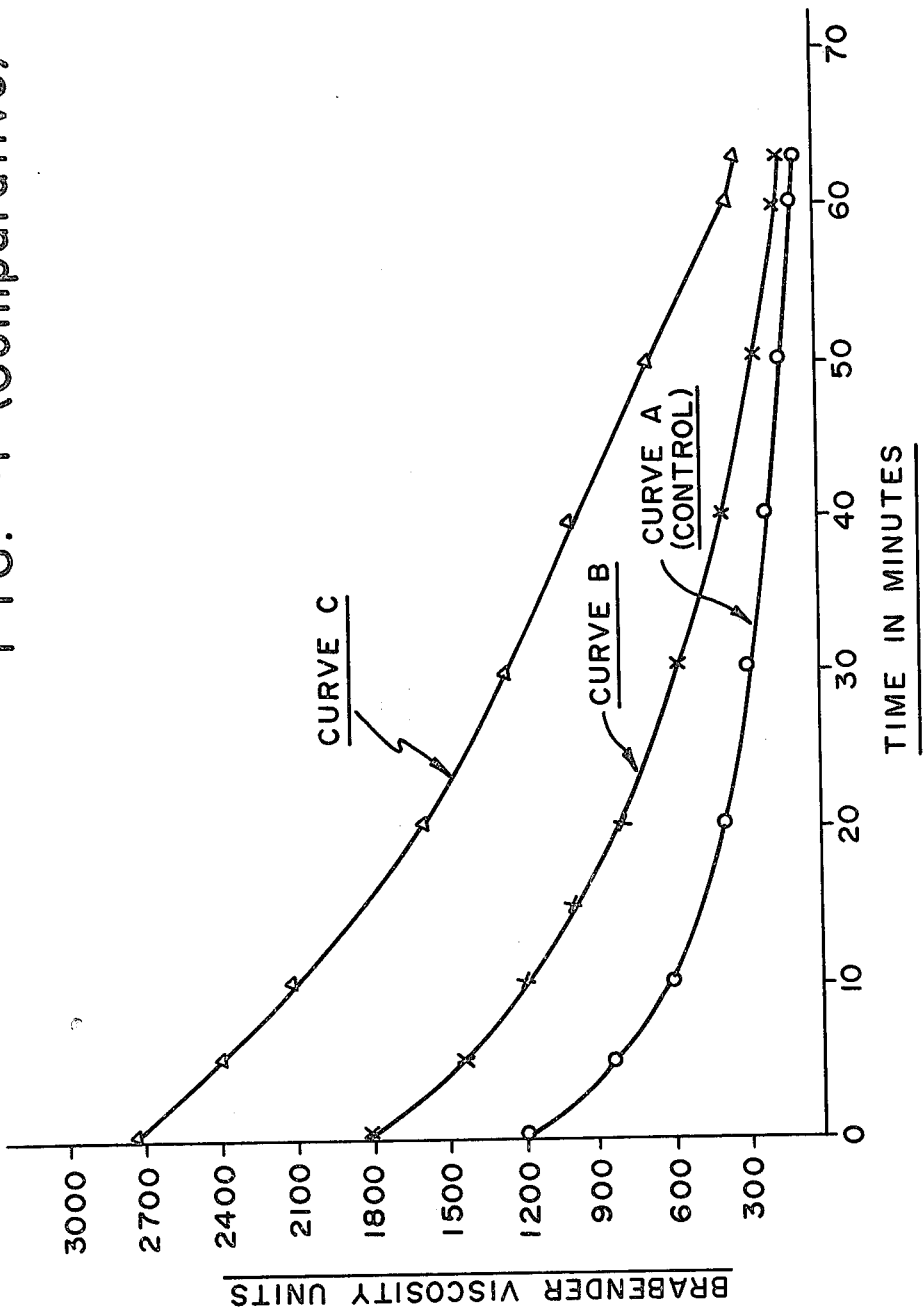
FIG. 4 (Comparative)

PROCESS FOR PREPARING CROSS-LINKED STARCHES USING STMP

This is a division of application Ser. No. 888,382, filed Mar. 20, 1978.

BACKGROUND OF THE INVENTION

I. Field of the Invention

This invention relates to starches which are cross-linked with sodium trimetaphosphate and to foodstuffs thickened therewith. More particularly it provides a dual derivatizing process which unexpectedly leads to crosslinked starches which provide superior viscosity characteristics when used as thickeners as compared to crosslinked starches of the prior art.

II. Brief Description of the Prior Art

Recent attempts to replace certain starch derivatives used in foods, e.g. epichlorohydrin inhibited starches, with other FDA acceptable starch derivatives, have placed new emphasis on starch derivatives formed with phosphate derivatizing reagents, especially sodium trimetaphosphate.

Methods for the production of starch phosphate esters have long been known. Thus U.S. Pat. Nos. 2,884,413, 2,801,242, 2,852,393 and 3,021,222, among others are directed to processes for the production of such starch derivatives and the various uses thereof. These derivatives, when contrasted with the corresponding raw, unmodified starches, will differ in properties depending upon the base starch employed. In the case of corn starch, the crosslinked starch gelatinizes somewhat earlier than the raw starch, reaches a higher peak or maximum viscosity and breaks down to a lesser extent than the raw starch. In the case of crosslinked amioca starch there is also less breakdown than the raw amioca with the crosslinked starch products maintaining their maximum viscosity under prolonged agitation, elevated temperature and low pH. Additionally, there is an improvement in the textural properties of the cross-linked starches when contrasted with the unmodified starch. Despite these advantages over the unmodified starches, when the crosslinked starches are re-slurried, drum dried and ground to a fine powder to make a starch useful in cold water swelling applications, serious deficiencies can be noted. Thus after the viscosity peak is achieved and maintained for a period of time in the initial dispersion, there is a loss of viscosity or "breakdown" in many food systems after subsequent cooking or baking. This breakdown results in a loss of both useable thickening power and textural properties, with a high breakdown usually indicating a gummy, cohesive texture and reversion of the starch to its original unmodified characteristics. Another such disadvantage is evidenced in thinning of starch stabilized fruit pastes in certain bakery products such as fruit filled tarts. This thinning often results in a "boil-out" or puncture of the pastry shell during baking thereby detracting from the appearance of the tart.

SUMMARY OF THE INVENTION

It has now been found that when starch is treated with sodium trimetaphosphate (STMP) in accordance with the dual derivatizing process of the present invention, and used as a thickener for foodstuffs, the cold water swelling crosslinked starch will, depending on the base starch employed, provide superior viscosity and textural characteristics.

According to the process of the present invention the granular starch base is derivatized in a primary crosslinking step with STMP at a pH of 10-12 and at a temperature sufficiently low to maintain the starch in an unswollen granular form. The slurry is then neutralized to a pH of 5-6.5, recovered and preferably washed in accordance with conventional known techniques. At this state, however, rather than reslurrying and drum drying as is carried out in typical STMP reaction procedures of the prior art, the starch is reslurried, adjusted to a pH of at least about 7.5 and additional STMP is added to the slurry. The resulting slurry is then fed onto a drum dryer and drum dried in accordance with conventional procedures to effect a secondary crosslinking reaction in situ.

The foodstuffs thickened with the starches resulting from this unique dual derivatizing reaction are characterized by superior viscosity-related properties as evidenced by their viscosity curves which, after peaking, maintain a high viscosity with little or no degradation or breakdown even after exposure to elevated temperatures for extended periods of time. While not wishing to be bound by theory, it is thought that this procedure is superior to conventional STMP crosslinking techniques in that the primary crosslinking reaction occurs only in the outer portions of the starch granule with limited penetration, while the subsequent secondary crosslinking is effected on a starch product which loses much of its granular form during the drum drying step so that the latter crosslinking reaction which occurs simultaneously during the drying takes place mainly on the dispersed starch and not on the granule.

BRIEF DESCRIPTION OF THE DRAWINGS

The four figures show Brabender viscosity curves for various starches including those produced in accordance with the present invention as well as those produced using prior art techniques.

DETAILED DESCRIPTION OF THE PREFERRED EMBODIMENTS

Figure 1:
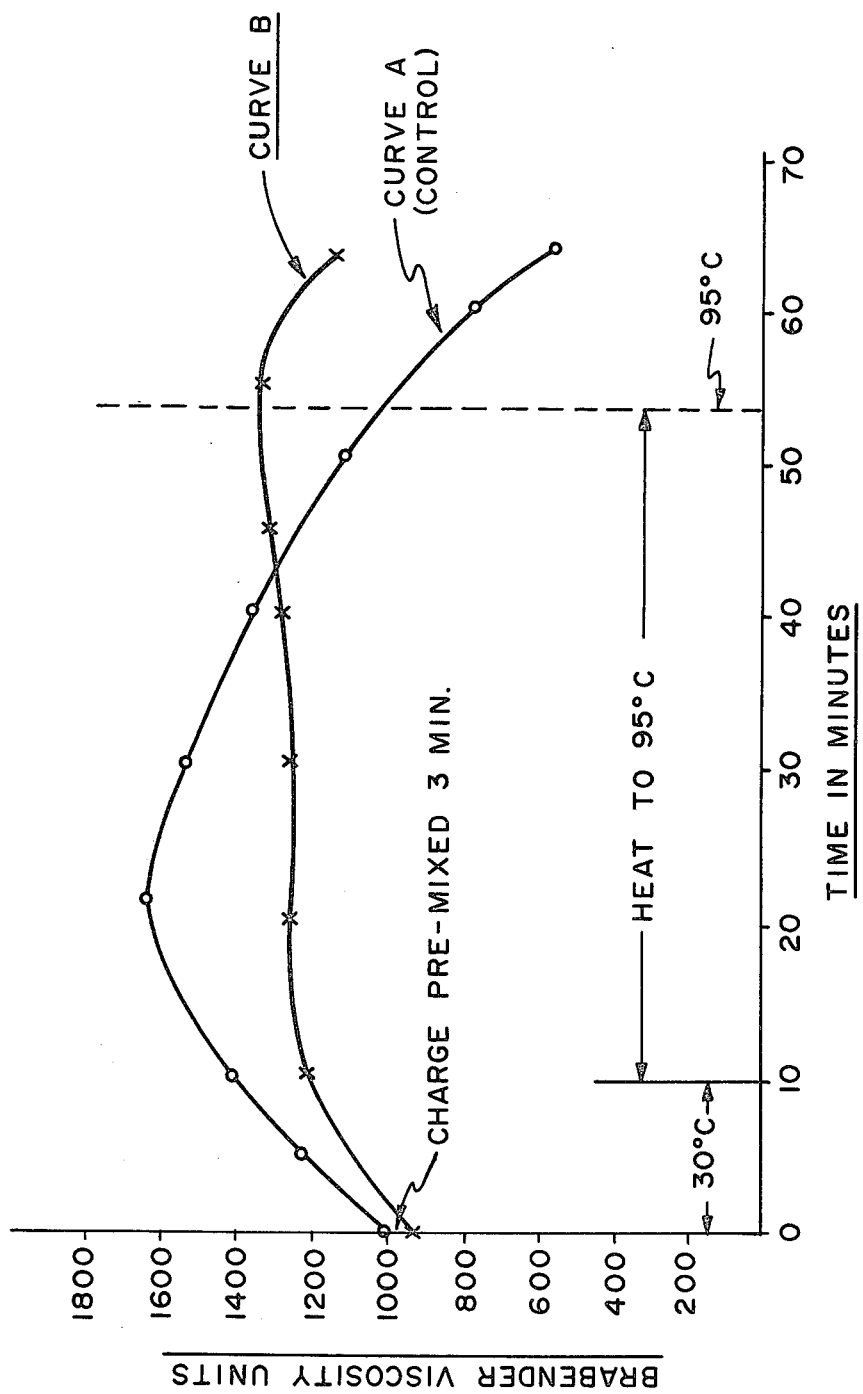

The applicable starch bases which may be used in the procedure of the present invention include any granular starch in raw or modified form. Useful starch bases include corn, waxy maize, grain, sorghum, wheat, rice, potato, sago, tapioca, sweet potato, high amylose corn, or the like. Also included are the conversion products derived from any of the starch bases including, for example, dextrins prepared by the hydrolytic action of acid and/or heat, oxidized starches prepared by treatment with oxidants such as sodium hypochlorite, and fluidity or thin boiling starches prepared by enzyme conversion or by mild acid hydrolysis. Particularly preferred starches, due to their end use applications, are corn, waxy maize and tapioca.

The primary crosslinking reaction of the starch base with the sodium trimetaphosphate reagent may be carried out using any of the procedures described in the aforementioned patents, the disclosures of which are incorporated herein by reference. Thus, in accordance with a preferred procedure, the pH of the aqueous starch slurry is adjusted to a range of 10 to 12, preferably 11 to 11.5, with any common alkali as, for example, with sodium hydroxide. The amount of reagent required to produce minimal crosslinking is quite small, i.e. of the order of about 0.03 percent based on the dry weight of the starch, when the time of the reaction is one hour, the temperature 50° C. and the pH 11. If temperatures below 50° C. are used, correspondingly more reagent should be used if time and pH are the same. In general, a range of reagent between about 0.01 and about 0.6 percent will be operable depending on the specific reaction conditions. A preferred range is between about 0.03 and about 0.2 percent. Although amounts higher than 0.6 percent are not detrimental for these conditions, such amounts serve no useful purpose. The reaction proceeds at a faster rate employing higher temperatures and pH and with increased amount of reagent.

As is known in the art, the addition of sodium ion has a positive effect on the degree of phosphorylation with a total sodium ion concentration of about 0.4 mole per liter of slurry usually giving satisfactory results herein. The optionally added sodium ion is most conveniently provided by the addition of sodium chloride to the starch slurry.

After the additional sodium ions are added, if employed, and the pH of the starch slurry has been adjusted to within the required range, the crosslinking reaction is allowed to proceed to the desired degree. The reaction may be facilitated by heating the slurry with agitation while keeping the temperature sufficiently low so as to maintain the starch in the unswollen granular state. In general, temperatures between about 30 and 50° C. are preferred but higher or lower temperatures may be used if process conditions are adjusted accordingly.

When the desired degree of crosslinking has been obtained (usually within 2-6 hours) as evidenced by monitoring the Brabender curve pattern, the crosslinked granular starch is neutralized to a pH range of 5.0-6.5, preferably 5 to 5.5, and recovered, as by filtration.

In accordance with the novel aspects of the present invention, the neutralized, primary crosslinked starch is preferably washed and then is reslurried in water at a solids concentration of at least about 20%, preferably about 38-42%, and sodium ions are optionally added, as by the addition of sodium chloride. The pH is then adjusted to at least 7.5, preferably 7.8-8.1 as, for example, with sodium carbonate. It will be recognized that use of higher pH's will result in higher degrees of the secondary crosslinking, however, due to the desired end-use of the crosslinked starches in food systems, lower pH conditions (below about 8.5) are desired since their presence will not detract from the long term stability of the food system. Temperatures in the reslurry stage should preferably be maintained at less than about 25° C. so as to ensure that further primary crosslinking does not occur on the granular starch prior to introduction onto the drum dryer. Higher temperatures may be used if additional STMP is employed to ensure that sufficient STMP is present for the secondary reaction effected on the drum dryer, however, no advantage is obtained therewith. Sodium trimetaphosphate is then added to the slurry in amounts comparable to those used in the primary crosslinking step (i.e. in the order of about 0.01-0.6%, preferably 0.03-0.2%, based on the dry weight of the starch).

The resulting mixture is then fed directly onto a drum dryer and dried to a suitable moisture level, usually below about 10%, preferably to about 5%, using conventional procedures. The drum dryer may be of an atmospheric type and may constitute either a single or double drum. In accordance with a preferred embodiment of the invention, the slurry is fed onto a main drum with multi-feed applicator rolls through perforated pipes or oscillating arms from a tank or vat provided with an agitator. Generally, the drum or drums are steam heated to a temperature within the range of about 135°-175° C. with the capacity of the drum dryer being proportional to the effective drying area, i.e. the total surface from which drying can take place. Thus, the aqueous slurry is fed into the nips formed by the main heated drum and applicator rolls wherein it gelatinizes and forms a rolling cylinder of starch paste thereby effecting secondary crosslinking with the reagent while also evaporating the water therefrom so as to ultimately yield dry, solid particles of pregelatinized dually crosslinked starch. It will be recognized that the drum drying conditions, e.g. temperature and drum speed, under which the starch is gelatinized, crosslinked and dried in this secondary reaction step will vary according to the particular starch base, the degree of crosslinking desired and the ultimate end-use application.

After drying, the dried sheet is removed, as by doctoring from the drum, and flaked, ground or milled to the desired mesh depending upon the end-use requirements employing procedures and apparatus well known to those skilled in the art.

In the following examples, which further illustrate the embodiments of the invention, all parts are by weight and all temperatures in degrees Celsius unless otherwise noted. In the examples, the properties of the starches are characterized by their respective Brabender curve patterns as illustrated in the Figures presented herein. The Brabender viscometer is used to give a continuous viscosity reading of a sample which is agitated as the temperature is increased at a uniform rate. Thus, aqueous suspensions of the starch are heated to temperatures above the gelatinization point, then held at that temperature for selected periods of time. The instrument thereby generates a complete history of cooking and swelling showing the onset of gelatinization, the peak or maximum viscosity reached, the slope of the curve traced in reaching the peak and the change in viscosity, if any, after reaching the peak.

EXAMPLE 1

This example illustrates the production of a crosslinked cold water swelling amioca starch in accordance with the present invention.

A water slurry of amioca at about 36% solids and 35°-38° C. was treated with 0.6% sodium chloride (based on starch solids). A water solution containing 3% by weight of sodium hydroxide was added until the total amount of sodium hydroxide was 0.6% of the weight of the starch. The pH at this stage was in the range 11.1-11.4. To this system, 0.18% sodium trimetaphosphate was added and allowed to react for about 3 hours. After the reaction, the system was neutralized to a pH range of 5.0-5.5 with hydrochloric acid and the starch was recovered by filtration. The starch was then washed and dried to a powder containing about 12% moisture.

A portion of the resultant starch was reslurried in water, drum dried and milled according to prior art pregelatinization techniques and was set aside as a control.

The remainder of the crosslinked amioca was then reslurried in water at a solids concentration of 38-42%. To this slurry was added 0.5% sodium chloride and 0.15% sodium trimetaphosphate based on the weight of the starch. The pH of the slurry was then adjusted to a range of 7.8–8.1 with sodium carbonate and drum dried with steam at about 100 psig pressure. The dried sheet was removed from the drum surface and milled to a powder such that 85–90% by weight would pass through a 200 mesh U.S. standard sieve.

A viscosity curve obtained by Brabender analyses of the resulting dually crosslinked starch is shown in FIG. 1 and compared with the curve obtained from the control distarch phosphate ester prepared above in accordance with prior art techniques. The Brabender testing was performed on a simulated fruit pie filling mixture prepared by blending starch with sugar and water to produce a dispersion containing 4.6% starch solids and 23% sugar and adjusting the pH to 2.7 with acetic acid. The mixture was then pre-mixed for 3 minutes, held at 30° C. for 10 minutes, heated to 95° C. and held at 95° C. for an additional 10 minutes as indicated in the figure.

In Curve A (the control), the viscosity peak is achieved within 10–15 min. after starting the heating cycle at a temperature of about 50° C. Thereafter, with continuous heating until a temperature of about 95° C. is reached and maintained, there is an undesirable loss of viscosity or breakdown. In contrast, the improved properties obtained with the starch prepared using the novel dual crosslinking process of the present invention are shown in Curve B. Here, the viscosity developed during the first 10 minutes, when the temperature is maintained at 30° C., is the result of pregelatinization/cold water swelling. After the start of heating, and during a uniform increase in temperature from 30° C. to 95° C., the viscosity has peaked and stabilized, in fact increasing slightly from the start to the end of the heating cycle. In addition to this significant resistance to viscosity breakdown, other disadvantages of the prior art materials are also practically eliminated. There is little or no loss in viscosity during heating, thus retaining thickening power, the texture is "short" without any tendency towards gumminess, and when used in fruit filling for tarts, the puncturing of the pastry shells is sharply reduced.

EXAMPLE 2

This example illustrates the production of a crosslinked cold water swelling corn starch in accordance with the method of the present invention. The resultant starch is characterized by a high viscosity curve and will produce a grainy or "pulpy" textured paste.

A water slurry of unmodified corn starch at about 36% solids and 35°–38° C. was treated with 1.15% sodium chloride based on the weight of starch solids. A water solution containing 3% by weight sodium hydroxide was added until the total amount of sodium hydroxide was 0.6% of the weight of the starch. The pH was then in the range of 11.1–11.3. Sodium trimetaphosphate in an amount of 0.15% based on the weight of the starch was added and allowed to react for about 3 hours. After reaction, the batch was neutralized to the pH range of 5.0–5.5 with hydrochloric acid. The starch was then recovered, washed and dried to a powder containing about 12% moisture.

As a control, a portion of the crosslinked starch was re-slurried and drum dried using conventional techniques to produce a cold water swellable starch.

The remainder of the crosslinked starch was re-slurried in water to an anhydrous solids concentration of 38–42% and then 0.5% sodium chloride and 0.2% sodium trimetaphosphate was added thereto. The pH of the slurry was adjusted to the range of 7.8–8.1 with sodium carbonate, and the starch slurry was drum dried using steam at about 100 psig pressure. The dried sheet was removed from the drum surface and milled to a coarse flake such that no more than 28% by weight will pass through a 100 mesh U.S. standard sieve.

Figure 2:
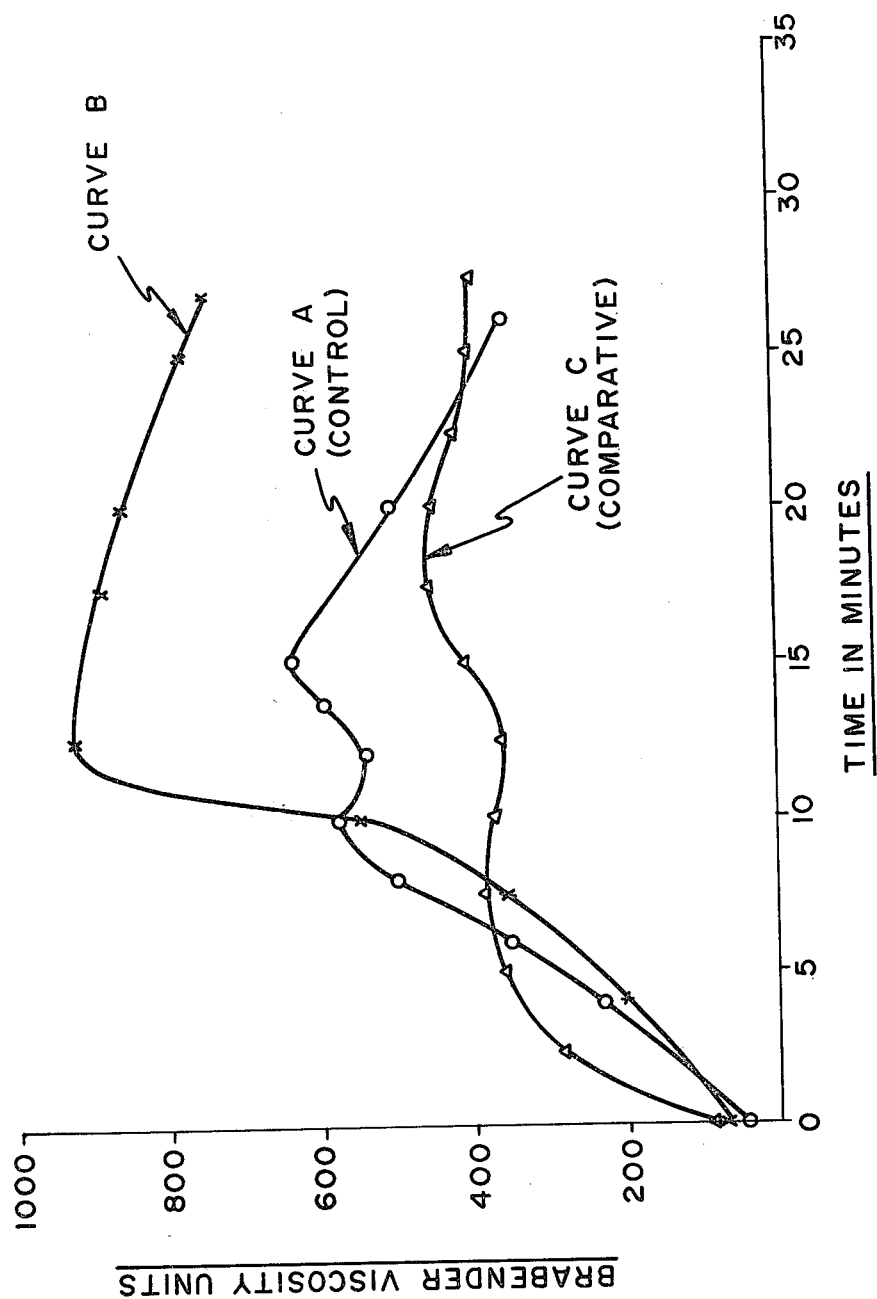

A Brabender curve for the resultant dually crosslinked starch is shown in FIG. 2 as Curve B and compared with the control (Curve A prepared as described above). The Brabender test performed in this example was done on a dispersion containing starch at 7.6% solids with acetic acid added to adjust the pH to 2.9. The maximum viscosity developed by the products prepared in accordance with the present invention is significantly higher than that achieved with the control starch. Even more dramatic than the change in viscosity pattern in the performance of the dually inhibited cold water swelling starches in retorted pastes and sauces, particularly those made with tomato. The heavy-bodied, "pulpy" or grainy texture which develops and is sustained on extended retorting in both high and low pH systems is more pronounced than in the systems of other products made with a single, granular inhibited base (including those inhibited with reagents other than sodium trimetaphosphate). This improvement in properties is most desirable in a product such as tomato sauce for spaghetti where a thick naturally "pulpy" texture and "mouth feel" are particularly important.

While it might be considered that the textural properties of the control starch (shown in Curve A, FIG. 2) would be improved without the necessity for the dual crosslinking merely by increasing the level of the primary crosslinking, such improvements have not, in practice, been observed. Thus, when the primary reaction is continued for a longer period of time using additional reagent, a Brabender curve pattern represented by that shown in Curve C, FIG. 2 is produced. Thus, such excessive crosslinking results only in a starch which is so highly crosslinked that it will not adequately cook and will produce opaque, low viscosity properties when used in foodstuffs.

EXAMPLE 3

This example illustrates the production of a crosslinked cold water swelling tapioca starch prepared in accordance with the method of the present invention. The dually inhibited starch is characterized by being readily dispersible in cold systems wherein it provides high viscosity and a "pulpy" textural appearance.

An aqueous slurry of tapioca starch at about 36% solids and 35°–38° C. was treated with 1.15% sodium chloride, based on the weight of the starch solids. A water solution containing 3% by weight of sodium hydroxide was added until the total sodium hydroxide was 0.6% of the weight of the starch. Sodium trimetaphosphate in an amount of 0.06% by weight was then added and allowed to react for 3 to 5 hours. After the reaction, the slurry was neutralized to a pH range of 5.0–5.5 with hydrochloric acid, washed and dried.

A portion of the resultant crosslinked starch was re-slurried and drum dried to provide a control starch, pregelatinized in accordance with prior art techniques.

The remaining crosslinked starch was re-slurried in water to an anhydrous concentration of about 40% and thereafter 0.5% by weight sodium chloride and 0.15% sodium trimetaphosphate was added. The pH was adjusted to the range of 7.8–8.1 with sodium carbonate. The slurry was then drum dried with steam at 100 psig pressure, doctored from the drum and milled to a coarse powder so that a maximum of 30% by weight would pass through a 100 mesh U.S. standard sieve.

Figure 3:
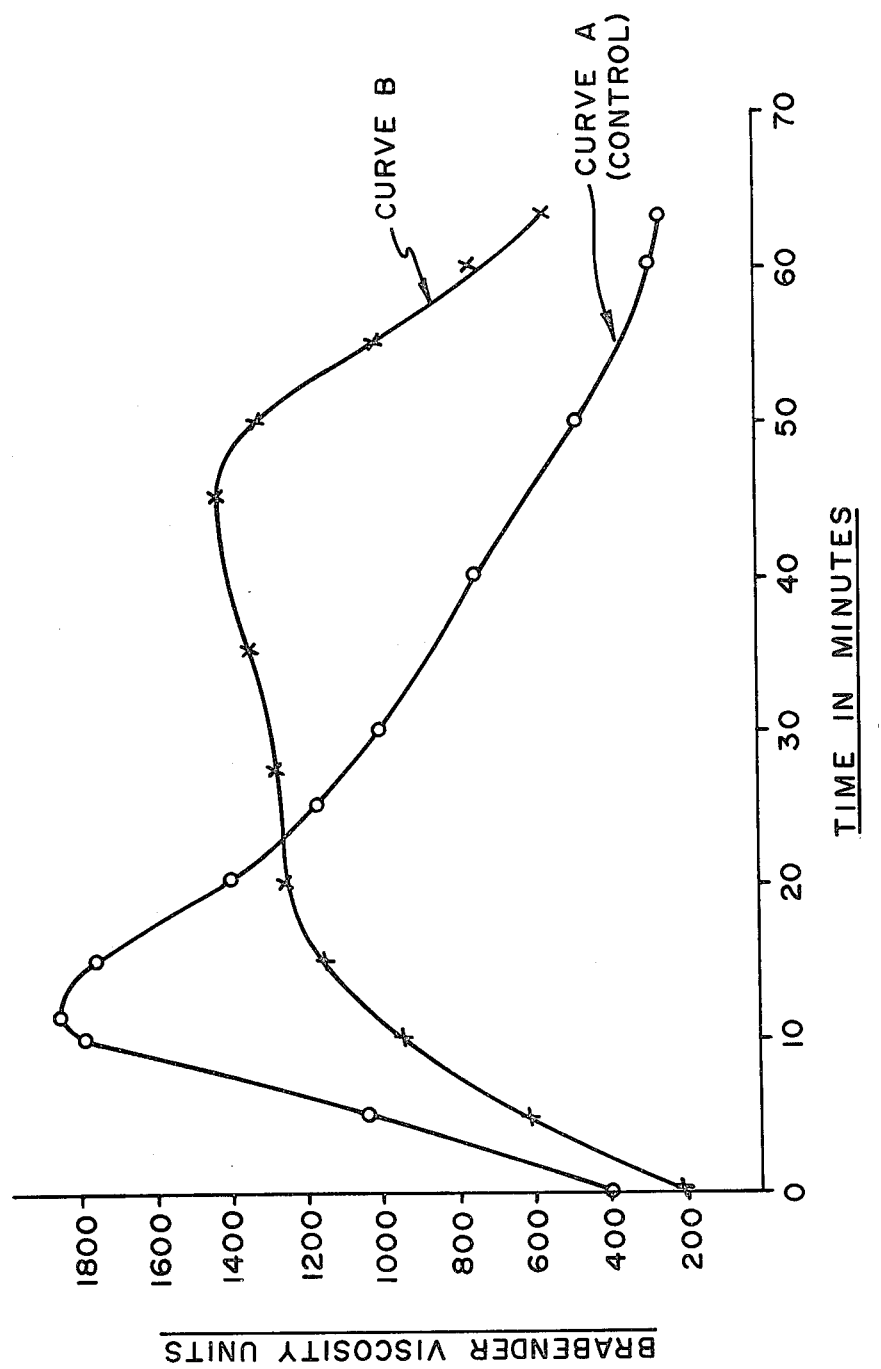

Brabender tests were performed as described in Example 1 with Brabender viscosity curves for the control starch (Curve A) and the dually inhibited starch of the present invention (Curve B) shown in FIG. 3. It is clearly seen that the curve of the control starch reaches a high, early peak viscosity, then shows a steep, rapid rate of breakdown. In contrast, the curve of the product made in accordance with the present invention shows a restricted rise in viscosity, sustained high viscosity over an extended time followed by breakdown to a higher final viscosity. Additionally, when used in cold water dispersion at neutral or acid pH ranges, the starches produced in accordance with the present invention are much heavier bodied, giving a "pulpier" texture than the control starch.

EXAMPLE 4 (Comparative)

In order to ascertain whether both inhibition steps are required or if the unique properties achieved by the process of the present invention could be obtained by performing only the secondary "in-situ" crosslinking step on the drum drier, the following example was performed. The Brabender tests were performed using the procedure described in Example 1.

Amioca starch (such as was used in Example 1) was slurried in water at an anhydrous solids concentration of 36% and treated with 0.5% sodium chloride and 0.25% sodium trimetaphosphate. After adjusting the pH to 7.8–8.1 with sodium carbonate, the batch was drum dried with steam at 100 psig pressure, then milled so that 85–90% passed through a 200 mesh U.S. standard sieve. The Brabender curve for this starch product is shown in FIG. 4, Curve B.

A second crosslinked starch was prepared as above except that the amount of sodium trimetaphosphate was increased to 0.40% by weight of the starch. This product is represented by Curve C.

As a control, raw amioca starch was pregelatinized according to conventional techniques. Thus, the amioca was treated as above, but no sodium trimetaphosphate was employed. This control starch is represented by Curve A.

A comparison of the three starches shows that the raw amioca, pregelatinized by drum drying (Curve A) is characterized by very early peak viscosity (the maximum being reached during the 3 minutes pre-mixing) high breakdown and a very gummy cohesive texture. The viscosity pattern for the crosslinked starches (Curves B and C) is unexpected in view of the results obtained using the process of the present invention as illustrated in Examples 1–3. Thus, maximum viscosities are reached early, (during the 3 minute pre-mixing) and the breakdowns are also very high. Additionally, gummy, cohesive textures are even more pronounced than observed for the control. Moreover, the maximum viscosity for the starch prepared with 0.25% sodium trimetaphosphate was 1.5 times that of the control and for the starch prepared with 0.40% sodium trimetaphosphate, it was almost 2.5 times the control.

The preferred embodiments of the present invention having been described above, various modifications and improvements thereon will now become readily apparent to those skilled in the art. Accordingly, the spirit and scope of the present invention is defined not by the foregoing disclosure, but only by the appended claims.

I claim:

1. A dual derivatizing process for the preparation of cold water swelling starches comprising the steps of:
   1. reacting a granular starch base in a primary crosslinking step with sodium trimetaphosphate in an amount of 0.01 to 0.6%, based on the dry weight of the starch, in an aqueous slurry at a pH of 10–12 and a temperature sufficiently low to maintain the starch in an unswollen granular state;
   2. neutralizing the slurry to a pH of 5–6.5;
   3. recovering the primary crosslinked granular starch;
   4. reslurrying the resultant starch in water at a pH of at least 7.5 and adding thereto additional sodium trimetaphosphate in an amount of 0.01–0.6%, based on the dry weight of the starch;
   5. drum drying the resultant slurry to effect a secondary crosslinking reaction in situ; and
   6. recovering the dried cold water swelling starch product.

2. The process of claim 1 wherein the starch base is corn, waxy maize or tapioca.

3. The process of claim 1 wherein the primary crosslinking reaction is performed at a pH of 11 to 11.5.

4. The process of claim 1 wherein the primary crosslinking reaction is performed at a temperature of 30° to 50° C.

5. The process of claim 1 wherein the granular crosslinked starch resulting from the primary reaction is reslurried in water at a pH of 7.8–8.1.

6. The process of claim 1 wherein the drum drying step is carried out at a temperature of 135°–175° C.

7. The process of claim 1 wherein the total sodium ion concentration in both crosslinking reactions is maintained at about 0.4 mole per liter of slurry.

* * * * *